Jan. 23, 1968     W. E. LUNDGREN     3,364,956
LOOM PICKER
Filed Oct. 22, 1965
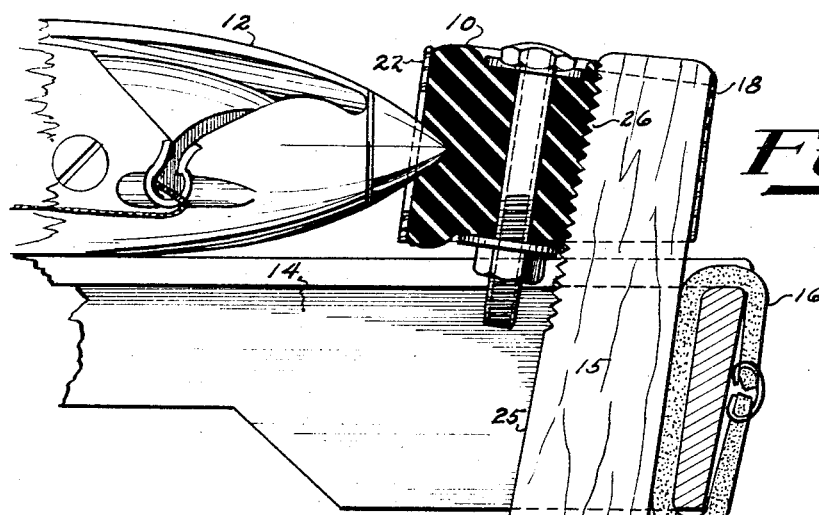
Fig. 1
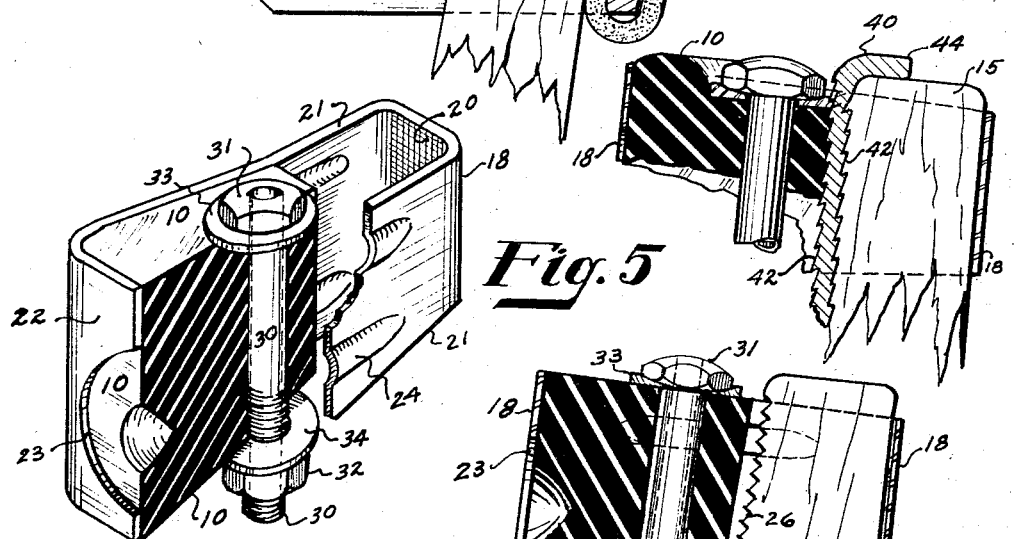
Fig. 5
Fig. 3
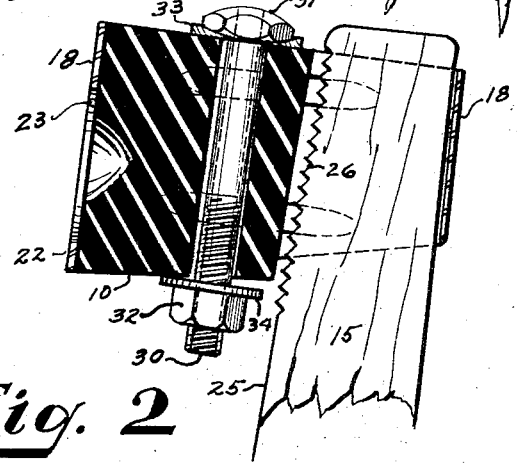
Fig. 2
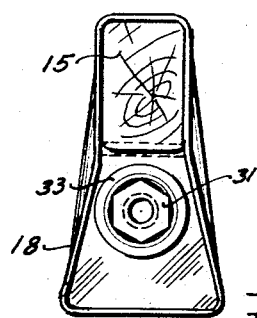
Fig. 4
Inventor
WILLIAM E. LUNDGREN
By Clayton L. Jenks
Attorney

United States Patent Office 3,364,956
Patented Jan. 23, 1968

3,364,956
LOOM PICKER
William E. Lundgren, 540 W. Main St.,
Northboro, Mass. 01532
Filed Oct. 22, 1965, Ser. No. 500,901
3 Claims. (Cl. 139—159)

ABSTRACT OF THE DISCLOSURE

A loom picker having a metal casing open at its top and bottom and provided with a large front opening for receiving the shuttle nose. A picker stick is secured against one end of the casing by a deformable, impact resisting elastomer adjacent said opening and the stick. A bolt having its adjustable threaded parts engaging only the elastomer serves to distort the latter to hold it and the picker stick tightly within the casing.

---

This invention relates to a loom picker and more particularly to a construction which secures the impact receiving picker on the loom picker stick.

The impact receiving picker has been mounted on the top end of the picker stick by various constructions and usually by means of screws. The screws may split the stick or at least form holes therein which makes it difficult to remount the picker in a new position, and thus often necessitating that the stick be discarded after a short period of use. That disadvantage has been overcome by the construction of my prior Patent No. 2,754,-851 of July 17, 1956, which comprises a manually adjustable wedge block for mounting the picker casing on the stick. Valuable space has, however, been required for containing the wedging mechanism with a consequent reduction in size of the impact plug as well as providing excessive and detrimental weight.

It is a primary object of my invention to overcome the disadvantages of the prior art and to provide a light weight, simple and comparatively inexpensive construction for holding the impact body in proper association with the picker stick, and which may be readily mounted or removed from the stick and adjusted easily to insure a tight and firm association of the two parts. Further objects will be apparent in the following disclosure.

In accordance with my invention, I mount the picker stick within one end of a hollow casing which carries the impact receiving body at the other end, and said body is made of a deformable, elastic or resilient impact resistant material capable of cushioning the shock caused by the loom shuttle and which may be distorted to clamp the picker stick firmly within the picker casing.

Referring to the drawings illustrating two embodiments of this invention:

FIG. 1 is a fragmentary, sectional view of a conventional lay end of the beam having a picker stick riding in its slot, which shows a casing surrounding the picker stick and an impact resisting elastomer picker in a pressure deformed shape which clamps the stick in firm contact with the casing;

FIG. 2 is a fragmentary sectional view showing the picker elastomer in a relaxed condition;

FIG. 3 is a perspective view of the picker casing, broken away to show the relaxed elastomer prior to insertion of the picker stick;

FIG. 4 is a plan view of the picker and stick; and

FIG. 5 is a view similar to FIG. 2 of a modification showing a serrated shim inserted between the elastomer and stick which insures holding the parts together firmly.

Referring first to FIG. 1 showing a part of a conventional loom construction, the picker body 10 adapted to receive the impact of the shuttle 12, which rides along the lay end of the beam 14, is mounted on the top end of the picker stick 15. The stick 15 rides in the usual slot in the lay end of the beam and has its motion cushioned by a suitable leather strap 16 as shown. The picker stick 15 is inserted into a hollow casing 18 suitably shaped from a steel tubing. The casing has a rear end wall 20 and two substantially parallel side walls 21 which slidably contain the stick. The casing has a front wall 22 provided with an opening 23 shaped and sized to permit the nose of the shuttle to strike only the elastomer body 10 which is mounted at the rear of the front wall. The casing 18 may be provided with suitably shaped indentations 24 (FIG. 3) for strengthening the same, or it may be otherwise shaped to provide the required strength.

The picker stick may have its front face 25 provided with serrations 26 if desired, or the face may be left in a comparatively rough condition. The primary feature of my invention involves mounting a deformable elastomer between the picker stick and the front wall 22 of the casing. When the elastomer is in its normal relaxed condition (FIG. 2) the stick may be readily inserted within the casing in contact with its rear wall 20. By applying pressure laterally of the body 10, either vertically or horizontally, the elastomer is squeezed or distorted longitudinally of the casing 18 to force the body tightly against the front wall 22 and the front face 25 of the stick. Thus the stick is clamped tightly in place against the rear wall 20, as well as against the side walls 21, so that the casing and its picker body 10 are rigidly mounted on the stick.

The distorting pressure may be applied to the elastomer 10 by various types of mechanism. One preferred construction comprises a bolt 30 which may be made hollow, if desired, to decrease the weight of the assembly. This bolt has a top head 31 shaped to be engaged by a suitable wrench. A nut 32 at the other end is threaded on the lower end of the bolt and located to be engaged by a wrench. Washers 33 and 34 sized to fit closely between the side walls of the casing lie in engagement with the elastomer body 10. These washers serve as pressure plates lying against the elastomeric body. The top of the bolt head and the bottom of the nut are preferably somewhat spherical in shape.

When the elastomer is in its relaxed condition the body 10 and the bolt parts are located as shown in FIG. 2. By applying suitable wrenches to the bolt head and the nut the elastomer is squeezed or distorted from the position of FIG. 2 to that of FIG. 1 whereby the washers become imbedded in the body 10 and distort the latter in such directions as are permitted by the construction. Primarily, that body 10 is thrust longitudinally and tightly against the walls 21 and 22 of the casing and the picker stick 15 and thus forces the stick, either directly or indirectly, rearwardly against the back wall 20 and so holds the casing immovable on the stick. To remove the picker and its casing, it is merely necessary to release the bolt pressure, whereupon the so-called memory of the elastomer causes it to return to its former shape while retaining its original volume.

A simple modification of the construction is shown in FIG. 5 wherein I insert a shim 40 between the elastomer body 10 and the stick 15. This shim, which may be made of metal, is preferably provided with serrations or teeth 42 on its opposite sides. The shim 40 which may be made somewhat like a wood rasp is preferably provided with buttress teeth 42 having horizontal surfaces at their tops on the picker stick side and horizontal surfaces at the bottoms of the teeth on the elastomer side, so that the shim cannot move lengthwise. That shim may have a lip 44 at its top which provides for easy withdrawal of the same after the elastomer pressure has been released. The shim is preferably as wide as the front face of the stick and rear face of the elastomer to insure full contact between the parts. Its teeth or serrations become embedded in the body 10 and the stick 15 whether or not the stick is preformed with mating teeth. In either construction of FIGS. 1 and 5, the elastomer when distorted applies pressure longitudinally of the casing 18 to hold the parts rigidly together.

Various elastomers may be used but I preferably employ a Disogrin brand No. 9250 of a solid homogenous polyurethane elastomer which has substantially the following properties:

Modulus of elasticity (100%) 1285
Tensile strength 5,300 p.s.i.
Shore A hardness 92
Elongation 750%
Tear strength 700 lb. per linear inch A primary characteristic is the ability of the elastomer to resist or cushion the impact of a fast moving shuttle and to throw it again on the return stroke without being abraded or torn for a long life of useful service. Essentially, the body 10, in addition to its strength and wear characteristics, is elastic or resilient and deformable without material change of volume under a laterally applied pressure, either parallel with the stick axis or transversely thereof, which serves to clamp the stick tightly against the rear wall 20 of the casing and holds the casing and its picker rigidly in position.

It will now be appreciated that various modifications may be made in this construction as well as in the composition of the elastomeric body. For example, the shim 40 of FIG. 5 may be replaced by a double faced sandpaper which will provide the required gripping action to hold the parts immovably positioned. Also various elastomers within the knowledge of those skilled in the art may be substituted for the preferred substance above described.

In accordance with the above disclosure, I have provided a loom picker comprising a hollow casing of various shapes and materials which has a vertical opening at one end for receiving the top end of the picker stick and a space at the opposite end which carries the elastic, deformable, impact resistant body adjacent the front wall of the casing. Said elastomeric body is so located that when deformed it will force the picker stick against the rear casing wall. The elastic body which may be of suitable composition, and is preferably formed of a polyurethane as above described, is located against the interior of the front wall and is distorted by the pressure plates 33 and 34 sufficiently to clamp the picker stick fixedly within the casing. These plates are of such size and location as to insure that the distortion pressure is applied primarily against the picker stick and the opposing wall of the casing to hold the latter fixedly in position on the stick. The deforming pressure is applied by the bolt 30 either vertically or transversely, and the parts are so located as to not interfere with the loom operation.

It is to be understood that the above description of preferred embodiments is not to be interpreted as imposing limitations on the appended claims.

I claim:
1. A loom picker comprising a hollow casing having front, rear and side walls providing a space for an impact resisting body and a vertical opening for receiving the upper end of a picker stick adjacent to the rear casing wall, said body being an elastomeric deformable, impact resisting material located within said space between said stick and front wall and being capable of cushioning the shock of throwing and receiving the impact of a fast moving loom shuttle and of being recoverably distorted by lateral pressure, said front wall having an opening which permits a shuttle to engage said body, a movable pressure plate engaging said deformable body remote from the stick, and adjustable means independent of the stick for moving said plate and applying pressure to and deforming said body which causes the latter to force the picker stick against said rear wall and hold the stick fixedly within said casing and secure said body in place, said casing being capable of withstanding the pressure applied by said means and the shock of cushioning the shuttle impact and said body recovering its original shape and freeing the stick for removal when the pressure on said plate is released.

2. A loom picker according to claim 1 in which said means comprises a bolt having a head and a nut on opposite sides of and contacting solely with the elastomeric body which are manually adjustable to distort said body laterally.

3. A loom picker according to claim 2 in which said casing is a shaped metal tubing having said stick and body mounted within opposite ends thereof and the bolt parts engage only the elastomeric body within the casing.

References Cited

UNITED STATES PATENTS

| | | | |
|---|---|---|---|
| 2,754,851 | 7/1956 | Lundgren | 139—159 |
| 3,312,253 | 4/1967 | Sedden | 139—159 |
| 1,575,598 | 3/1926 | Gagnon | 139—159 |
| 1,584,872 | 5/1926 | La Plante | 139—159 |
| 2,389,157 | 11/1945 | Kottemann | 139—159 |
| 2,671,473 | 3/1954 | Campbell | 139—159 |
| 2,943,647 | 7/1960 | Budzyna | 139—159 |

FOREIGN PATENTS

| | | |
|---|---|---|
| 215,918 | 3/1942 | Switzerland. |
| 217,200 | 1/1942 | Switzerland. |
| 715,309 | 9/1954 | Great Britain. |
| 723,262 | 2/1955 | Great Britain. |
| 839,135 | 6/1960 | Great Britain. |

MERVIN STEIN, *Primary Examiner.*

J. KEE CHI, *Assistant Examiner.*